(12) United States Patent
Stevens

(10) Patent No.: US 6,876,160 B1
(45) Date of Patent: Apr. 5, 2005

(54) FLUORESCENT BALLAST WITH FIBER OPTIC AND IR CONTROL

(76) Inventor: Carlile R. Stevens, P.O. Box 8290, Horseshoe Bay, TX (US) 78657

(*) Notice: Subject to any disclaimer, the term of this patent is extended or adjusted under 35 U.S.C. 154(b) by 0 days.

(21) Appl. No.: 10/642,944

(22) Filed: Aug. 18, 2003

Related U.S. Application Data

(63) Continuation-in-part of application No. 10/104,076, filed on Mar. 21, 2002, now Pat. No. 6,628,093.
(60) Provisional application No. 60/281,841, filed on Apr. 6, 2001, now abandoned.

(51) Int. Cl.[7] ............................................. G05F 1/00
(52) U.S. Cl. .................. 315/308; 315/200 R; 315/224; 315/149
(58) Field of Search ................... 315/200 R, 219–220, 315/224, 209 R, 246, 276–277, 291–292, 299, 307–308, DIG. 5, DIG. 7, 149; 362/551, 554

(56) References Cited

U.S. PATENT DOCUMENTS

| | | | | |
|---|---|---|---|---|
| 4,277,728 A | * | 7/1981 | Stevens ....................... | 315/307 |
| 5,363,020 A | * | 11/1994 | Chen et al. .............. | 315/209 R |
| 5,371,439 A | * | 12/1994 | Griffin ..................... | 315/209 R |
| 5,600,211 A | * | 2/1997 | Luger ......................... | 315/307 |
| 5,677,602 A | * | 10/1997 | Paul et al. .................. | 315/224 |
| 6,072,283 A | * | 6/2000 | Hedrei et al. ............... | 315/307 |
| 6,198,230 B1 | * | 3/2001 | Leeb et al. ................. | 315/224 |
| 6,259,215 B1 | * | 7/2001 | Roman ....................... | 315/307 |
| 6,329,761 B1 | * | 12/2001 | Melis et al. ............ | 315/209 R |
| 6,426,599 B1 | * | 7/2002 | Leeb .......................... | 315/224 |
| 6,696,803 B2 | * | 2/2004 | Tao et al. ................... | 315/291 |

* cited by examiner

Primary Examiner—Thuy Vinh Tran
(74) Attorney, Agent, or Firm—Roger A. Marrs

(57) ABSTRACT

A ballast with circuitry to allow the level of the lighting device to be adjusted, a separate direct current input and a sensing circuit within the ballast to lower the light level and thus the amount of power required from the direct current input when the normal line power fails. A method of recharging the battery by supply current to flow out of the direct current input when the ballast is operating from line power is also provided.

3 Claims, 3 Drawing Sheets

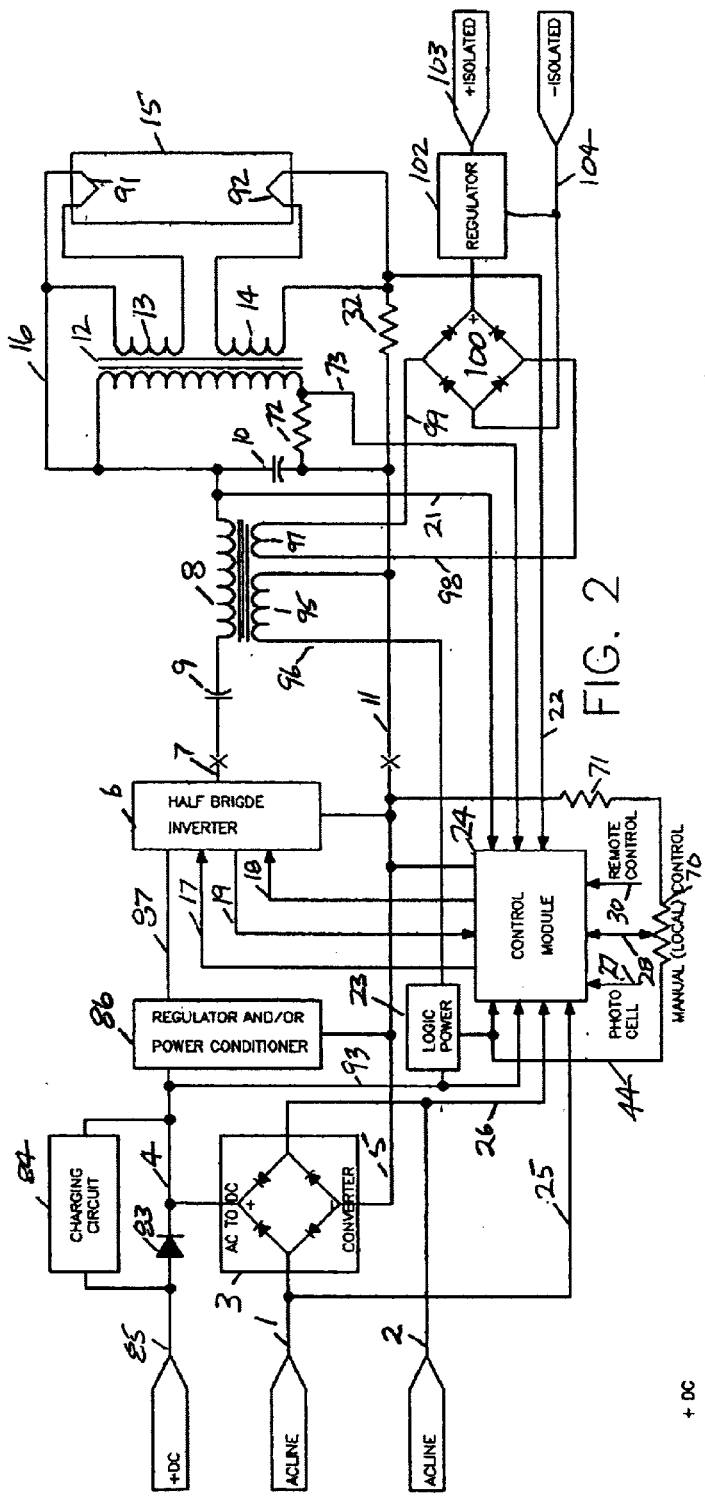
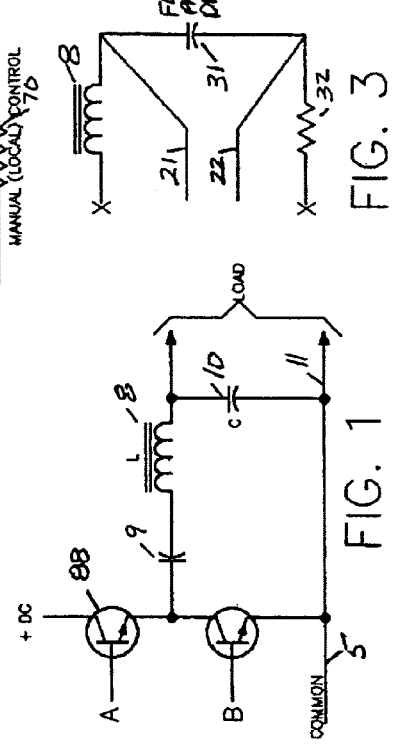
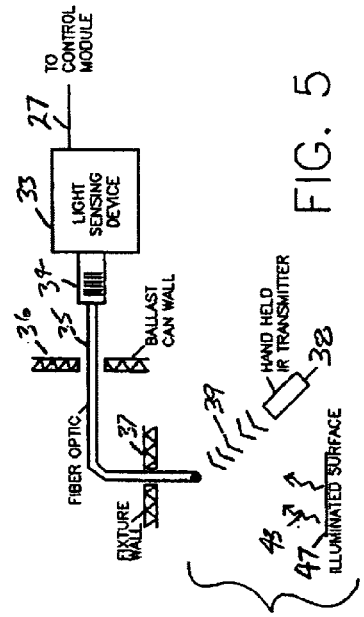
FIG. 2
FIG. 5
FIG. 3
FIG. 1

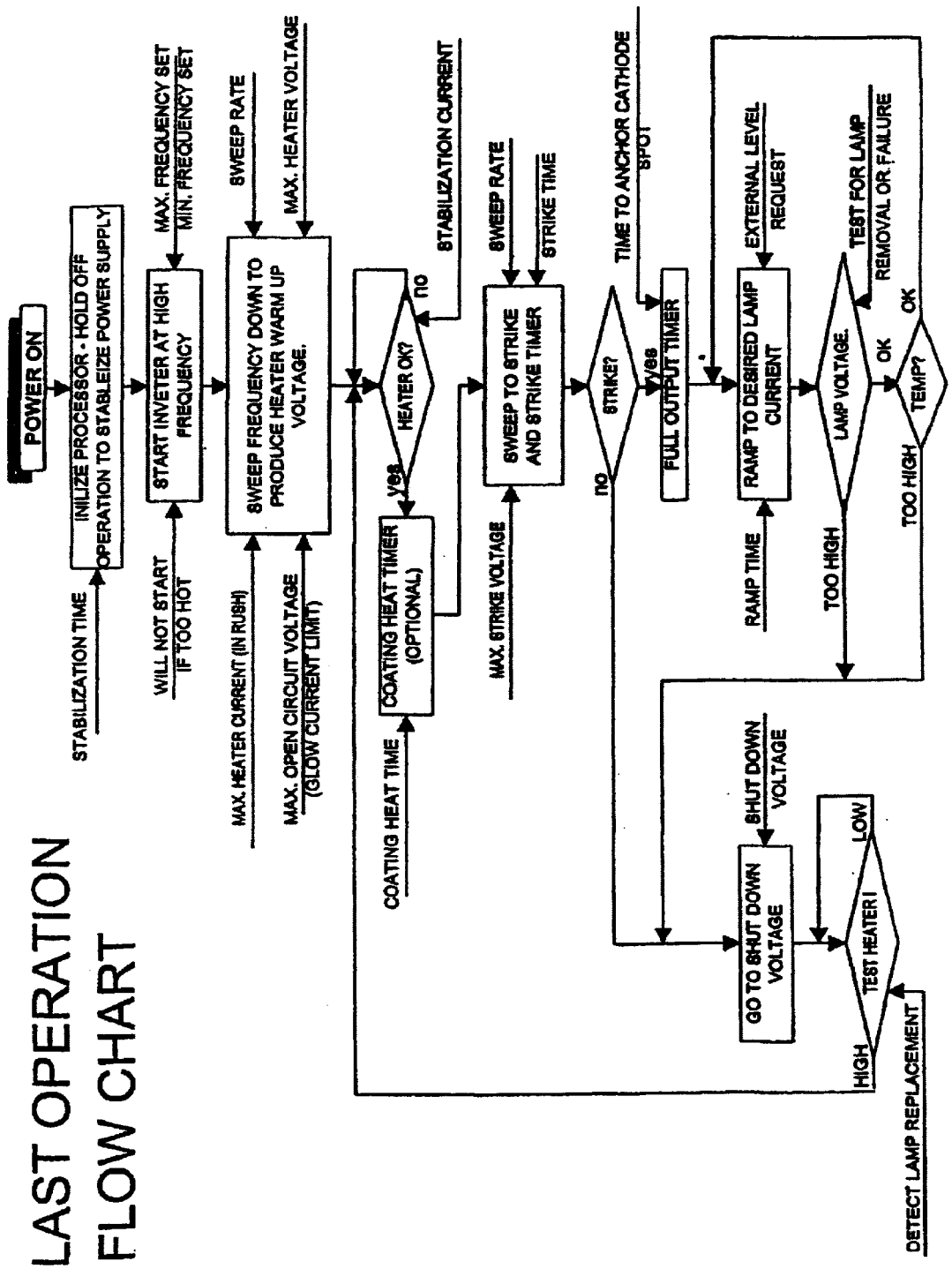

FLUORESCENT BALLAST WITH FIBER OPTIC AND IR CONTROL

Priority claimed on Ser. No. 60/281,841 filed Apr. 6, 2001 (ABANDONED) Continuation in part of patent application Ser. No. 10/104,076 filed Mar. 21, 2002 now U.S. Pat. No. 6,628,093.

BACKGROUND OF TEE INVENTION

1. Field of the Invention

The present invention relates to the field of power inverters used for electronic lighting ballast and use of light sensors and fiber optics wires to control them. A typical ballast lighting system contains an infra red (IR) receptor as well as a fiber optic light conductor to conduct the IR pulsed from a point external to the lighting fixture to the internally incorporated IR receptor. The fiber optic conducted light is also used to control and maintain the user selected amount of light on the illuminated surface by the use of feedback of the light sensed at the input of the fiber optic wire.

2. Brief Description of the Prior Art

There are many varied public domain circuits involving the generation of high frequency inputs for driving fluorescent lamps, compact fluorescent lamps, high intensity discharge and other forms of gas discharged lighting. There a number of methods of controlling lighting levels all of which involve some sort of signal over a control wire or the power line. One of the problems with many lighting systems is adjusting the light level on a fixture by fixture basis. Even the new dimmable ballasts with control inputs must be told by some remote control system what light level is required. A better system in many applications is to allow the ballast and thus the light emitted by a fixture to be adjusted locally by the person or persons working in the illuminated area. To the best of this inventors knowledge there is no prior art involving a gas discharge lighting ballast that incorporates within it an IR detector or a visible light detector with a fiber optic light conductor to allow remote setting of or maintenance of the light level.

SUMMARY OF THE INVENTION

Accordingly, the above problems and difficulties are obviated by the present invention which is a gas discharge lighting ballast with circuitry to allow the level of the lighting device to be locally set using a light sensor within the gas discharge lighting ballasting device and a light conducting fiber, sometimes called a light pipe or fiber optic wire, to conduct light levels and light signals from an external source outside the fixture in which the gas discharge lighting device is mounted.

OBJECTS OF THE INVENTION

Therefore, it is among the primary objects of this invention to supply a simple and easy method to locally adjust the light level of gas discharged lighting device.

It is another object of this invention to maintain the light level, once set, at the preset level.

Yet another object of the invention is to accomplish the above objects with a minimum amount of hardware and therefore for a price that makes the device acceptable in the marketplace.

BRIEF DESCRIPTION OF THE DRAWINGS

The features of the present invention which are believed to be novel are set forth with particularity in the appended claims. The present invention, both as to it's organization and manner of operation, together with further objects and advantages thereof, may best be understood with reference to the following description, taken in connection with the accompanying drawings in which:

FIG. 1 shows a half bridge configuration of an inverter with switching alternately applied again between points A and B. Because switching device A is not connected to the common bus, only certain types of switches may be used practically in this application. For example, a vacuum tube would be very difficult but not impossible to apply here;

FIG. 2 is a block diagram of a preferred embodiment of the subject invention driving a gas discharge lighting device;

FIG. 3 depicts a change in the preferred embodiment of FIG. 2 to drive a flat panel lighting display light;

FIG. 5 is a depiction of how a light sensing device is connected to the microprocessor of FIG. 4 and to a fiber optic wire to allow for external information to be supplied to the microprocessor, and FIG. 6 is a software flow chart of the most desirable way for a ballast to start and operate a fluorescent lamp which can greatly prolong the life of the driven lamp.

OPERATIONAL DESCRIPTION OF THE PREFERRED EMBODIMENT

Figure 4:
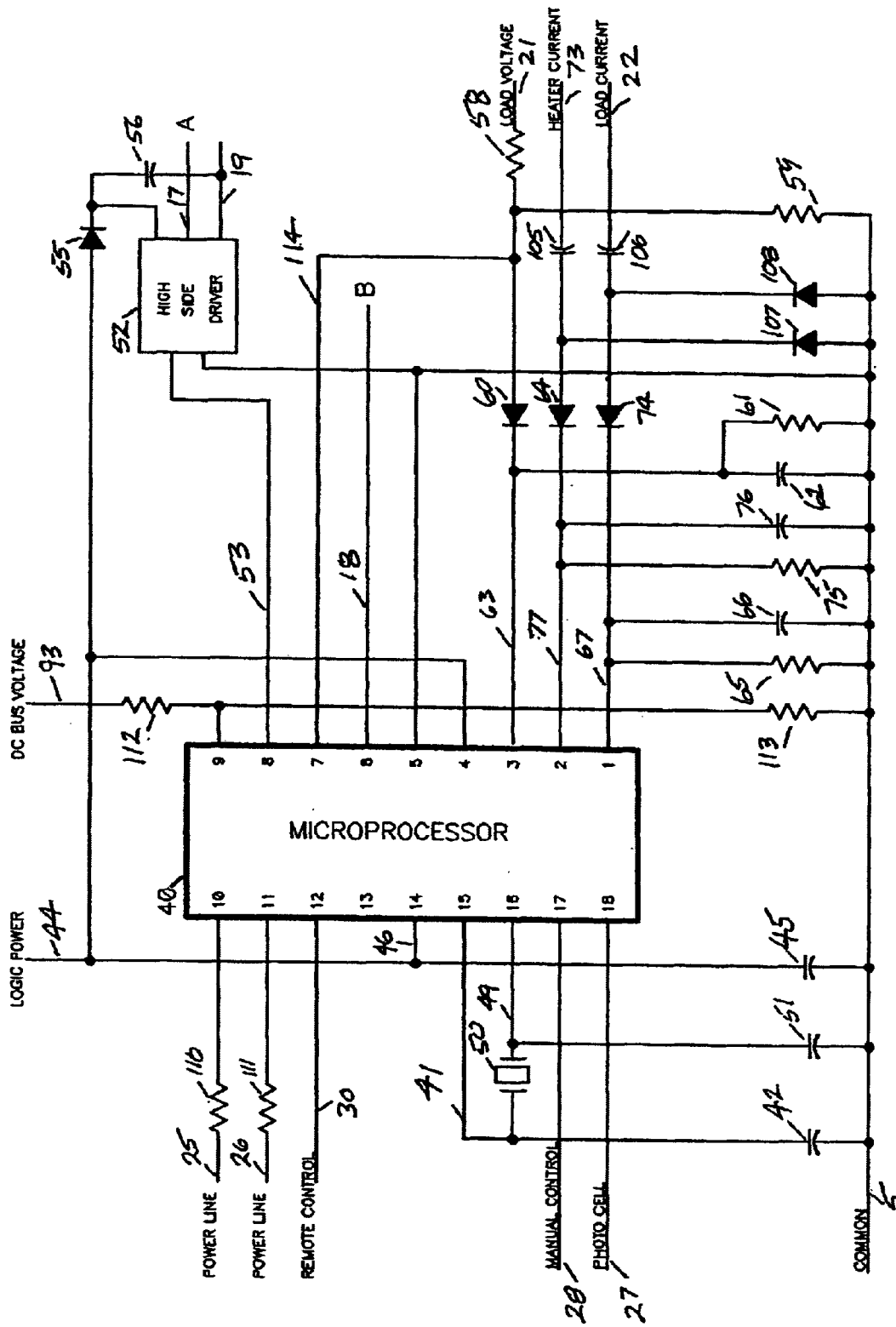
FIG. 4 is a schematic representation illustrating a microprocessor chip the control module of FIG. 2.

Referring now to FIG. 2, electrical power enters from the AC power line on lines 1 and 2 to the AC to DC converter module 3 and leaves on lines 4 and 5 as plus and minus DC power. The AC to DC conversion module 3 can be any form of public domain conversion system. In this instance, a 4 diode bridge is depicted. The DC voltage and current is further conditioned and regulated to correct the power factor and harmonic distortion with respect to the power line by regulator and/or power conditioner 86 which could be any form of public domain regulator such as the method depicted in my U.S. Pat. No. 4,277,728, now expired. 'And/or' is used in the description because in some applications only power conditioning is needed and in other cases only regulation in needed. A single circuit does either or both but the one that does both is more expensive to manufacture.

Block 6 is the half bridge converter as shown in FIG. 1. Line 17 connects point A of FIG. 2 to the control and drive module 24. Line 18 connects point B of FIG. 1 to the control and drive module. The output of the half bridge 6 is on line 7 and connects, via DC blocking capacitor 9, to inductor 8. It also connects to control and drive module 24 via line 19. DC blocking capacitor 9 is large enough that its value does not enter into the resonant calculation but acts simply to pass the AC with little or no impedance while totally blocking any DC component from flowing into the load. Inductor 8 and capacitor 10 make up a series resonant circuit that converts the square wave output of the half bridge to a sine wave This is applied to the output load in this case a gas discharge fighting device 15 by line 16 and through current sensing resistor 32 to line 11. Transformer 12 connected between line 16 and through current sensing resistor 72 to line 11, across the load, provides power for the lamp's heaters 91 and 92 from secondary windings 13 and 14 respectively.

Control module 24, which will be further discussed under the description of FIG. 4, receives the current feedback from current sense resistor 32, which also may be any other form of current sensor, via line 22. Output voltage across the load is fed back on line 21. This line also serves to feed back the phase of the sign wave that is presented across the load and may be used by the control module to maintain a resonant frequency if required. Heater current is fed back via line 73 as a voltage drop across resistor 72 which is in series with the primary of heater transformer 12. When power line carrier signal is used to send control information to the control and drive module, the signal is presented to the module through lines 25 and 26. Photocell input on line 27 which is either a series of operational input control pulses or the amount of light on the surface illuminated by the gas discharge lighting device or both. Manual/local control of the output power may be adjusted by potentiometer 70 the wiper of which is connected at microprocessor input 17 via line 28. Resistor 71 in series with potentiometer 70 sets the minimum output level.

Logic power to the control module is provided from the logic power module 23 which is supplied from either the DC bus 4 via line 93 for start up or winding 95 on inductor 8 via line 96. A supply of isolated power for the operation of various control devices by tapping power from inductor 8 via secondary 97 connected by lines 98 and 99 to bridge rectifier 100. The output of bridge rectifier 100 is fed via line 101 to regulator 102 while line 104, connected to the (−) side of the bridge rectified becomes the common for this isolated supply which is output at 103.

Referring to FIG. 3, the connection for the electro-luminescent or flat panel display is shown. The two points X and X are connected in FIG. 2 where the X and X are to replace the circuitry to the right of the X's in FIG. 2. Inductor 8 is connected in the same manner as in FIG. 2, but capacitor 10 of FIG. 2 is replaced by the electro-luminescent panel itself, 31. The panel is, in fact, a large capacitor, therefore, it serves not only as the load, but as the resonant capacitive element. The DC blocking capacitor 9 of FIG. 2 is not needed since the load itself is a capacitor.

Referring now to FIG. 4 logic power for microprocessor 40 is fed in on line 44 from the logic power module. It is further filtered by capacitor 45 and supplied to the microprocessor at the Vdd input 14 on line 46. The operating frequency of the processor chip is set by the selection of crystal or resonator 50 which is loaded by capacitors 42 and 51 connected to the processor at the oscillator inputs 15 and 16 by lines 41 and 49. The frequency is varied according to the application. For example, when driving a flat panel display, the frequency is between 800 and 1,000 hertz. When driving a high-intensity discharge lamp, the frequency may be as high as 100 kilohertz or more. Typical fluorescent lamp applications operate in a frequency between 20 and 70 kilohertz.

The microprocessor output is at pins 6 and 8. Pin 6 is connected directly by line 18 to the drive point B to turn on the bottom transistor in the half bridge. Output Pin 8 is connected by line 53 to high side driver to drive the top transistor at point A through line 17. Since this transistor is not referenced to the common bus, a high side driver must be employed. Power for the high side driver used to drive the transistor is created by charging capacitor 56 through diode 55 when the bottom transistor is on and the output of the bridge is low.

The voltage across the output load is fed back by line 21 and divided by voltage divider resistors 58 and 59 to a voltage that is acceptable to the processor. It is then fed by line 114 to input 7 to allow the microprocessor software to determine the phase angle of the output voltage. By adjusting the frequency to maintain a 90 degree phase shift across the resonant inductor 8 the processor can be sure that the output is always at resonance. The voltage at the junction of resistors 58 and 59 is also rectified by diode 60 and filtered by capacitor 62 and load resistor 61 to input 3 via line 63 to allow the microprocessor to determine the output voltage magnitude. This is very useful when driving the flat panel display of FIG. 3.

The load current is sensed by sensor 32 of FIGS. 2 and 3 and is fed in via line 22 to capacitor 106 which is part of a voltage doubler consisting of capacitor 106, diode 108 and diode 74. A doubler is used so current sense resistor 32 may be reduced in size by a factor of 2 thus reducing any heat loss in the resistor. The doubled voltage is filtered by capacitor 66 and resistor 65 and presented to analog input at Pin 1 via line 67. The voltage representing the heater current is fed on line 73 to doubler consisting of capacitor 105, diode 107 and diode 64 and filtered by capacitor 76 and load resistor 75 and fed by line 77 to the microprocessor. at input 2. Local control of the output power may be adjusted by potentiometer 70 of FIG. 2, the wiper of which is connected at input 17 via line 28. Resistor 71 in series with potentiometer 70 sets the minimum output level. The output voltage from the photocell may be both analog or digital and is carried by line 27 to the microprocessor input at Pin 18. This form of a light sensing device 33 is also referred to as a photocell.

FIG. 5 depicts a light sensing device 33 connected to a fiber optic wire 35 by connecting collar 34. The fiber optic wire passes though the ballast can wall 36. The ballast enclosure, also called a can, contains all the electronic ballasting components and is mounted inside the fixture containing the gas discharge lighting device. The fiber optic wire 35 then passes though the fixture wall 37. The end of the fiber optic wire 35 extends into the illuminated area and receives visible light rays 43 from the illuminated surface 47 and IR pulses 39 from hand held IR transmitter 38. The level of light and the presence or absence of IR pulses is fed as an electrical signal via line 27 to microprocessor 40 at input 18. The software program within the microprocessor detects sudden changes in light as digital pulses and the average light level for adjusting the illumination.

Referring back to FIG. 4, remote control is normally a pulse width modulation control signal and therefore it is digital and will be presented by line 30 to digital input at Pin 12. If a power line carrier signal is sent, it is sensed on lines 25 and 26 at inputs 10 and 11 which look for changes on the power line signal. Two inputs are used to look for each half cycle of the power line.

FIG. 6 is a software flow chart for a high frequency power supply that is operating as a fluorescent ballast which is included to show of the complexity of function allowed by using a microprocessor as an inverter driver or ballast control element. The multiple software decisions allow for many operational advantages such as lamp start up and control if a lamp is suddenly removed from the fixture or fails while operating. The resulting action by the microprocessor allows for safer and more reliable operation while greatly extending lamp life. Each box rectangular box states the function implemented by the software for each different type of ballast. The arrows pointing at the diamond shaped boxes shows the data needed to make decisions.

Although the present invention has been described in connection with preferred embodiments thereof many variations and modifications will now become apparent to those skilled in the art. It is preferred, therefore, that the present invention be limited, not by the specific disclosure herein, but only by the appended claims.

What is claimed is:

1. A gas discharge lighting system comprising:

a gas discharge lighting device;

a source of input power;

an electronic ballasting circuit having a regulated direct current requirement and coupled between said gas discharge lighting device and said source of input power comprising:

an alternating current-to-direct current conversion means;

a power regulator connected to said conversion means for converting an output of said alternating current-to-direct current to said regulated direct current required to operate said ballasting circuit;

a controllable output direct current to alternating current inverter that operates with a substantially square wave output at a frequency above that of audible sound;

an impedance network interposed between said inverter and said gas discharge device to modify said square wave output of said inverter to provide proper operation of said gas discharge lighting device;

a controlling device that controls the operation of said inverter and via said impedance network, thereby providing an output to said gas discharge lighting device; and a light sensing device for sensing an amount of illumination provided by said gas discharge lighting device and connected to said controlling device to allow said controlling device to maintain the amount of illumination at a preset level;

wherein said light sensing device being mounted internally within said ballasting circuit and including a fiber optic wire for conducting light from a user specified location outside said ballasting circuit to said internally mounted light sensing device; and wherein said controlling device is a microprocessor coupled to said gas discharge lighting device to monitor the operation of said gas discharge lighting device and interconnected with said controllable output direct current-to-alternating current inverter.

2. The gas discharge lighting system as set forth in claim 1 wherein light conducted by said fiber optic wire is in an infrared spectrum for control signals to adjust various ballasting operating parameters including a desired light level of said gas discharge lighting device.

3. The gas discharge lighting system as set forth in claim 1 wherein light conducted by said fiber optic wire is in an infrared spectrum for control signals and in a visible light spectrum for feedback of light intensity in an area illuminated by said gas discharge lighting device.

* * * * *